(12) United States Patent
Niessner et al.

(10) Patent No.: US 11,390,736 B2
(45) Date of Patent: Jul. 19, 2022

(54) ULTRA-HIGH FLOW ACRYLONITRILE BUTADIENE STYRENE COPOLYMER COMPOSITIONS

(71) Applicant: INEOS STYROLUTION GROUP GMBH, Frankfurt am Main (DE)

(72) Inventors: Norbert Niessner, Friedelsheim (DE); Gisbert Michels, Leverkusen (DE); Thomas W. Cochran, Channahon, IL (US); Shridhar Madhav, Vadodara (IN); Kirit Gevaria, Vadodara (IN); Mukesh Modi, Vadodara (IN)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 2 days.

(21) Appl. No.: 17/047,419

(22) PCT Filed: Apr. 12, 2019

(86) PCT No.: PCT/EP2019/059461
§ 371 (c)(1),
(2) Date: Oct. 14, 2020

(87) PCT Pub. No.: WO2019/201784
PCT Pub. Date: Oct. 24, 2019

(65) Prior Publication Data
US 2021/0108062 A1    Apr. 15, 2021

(30) Foreign Application Priority Data
Apr. 16, 2018 (EP) ..................... 18167446

(51) Int. Cl.
| C08L 25/12 | (2006.01) |
| C08L 55/02 | (2006.01) |
| C08L 53/02 | (2006.01) |
| C08F 297/04 | (2006.01) |

(52) U.S. Cl.
CPC .............. *C08L 25/12* (2013.01); *C08L 55/02* (2013.01); *C08F 297/044* (2013.01); *C08L 2205/03* (2013.01)

(58) Field of Classification Search
None
See application file for complete search history.

(56) References Cited

U.S. PATENT DOCUMENTS

| 4,009,226 A | 2/1977 | Ott et al. |
| 4,091,053 A | 5/1978 | Kitchen |
| 4,181,788 A | 1/1980 | Wingler et al. |
| 4,584,346 A | 4/1986 | Kitchen |
| 4,704,434 A | 11/1987 | Kitchen et al. |
| 4,704,435 A | 11/1987 | Kitchen |
| 5,227,419 A | 7/1993 | Moczygemba et al. |
| 5,399,628 A | 3/1995 | Moczygemba et al. |
| 6,096,828 A | 8/2000 | Deporter et al. |
| 2010/0168315 A1 | 7/2010 | Park et al. |
| 2010/0210773 A1 | 8/2010 | Seo et al. |
| 2016/0075813 A1 | 3/2016 | Niessner et al. |
| 2016/0083572 A1 | 3/2016 | Niessner et al. |
| 2017/0058117 A1 | 3/2017 | Sato et al. |
| 2017/0292017 A1 | 10/2017 | Jung et al. |

FOREIGN PATENT DOCUMENTS

| CN | 102108164 A | 6/2011 |
| CN | 102786767 A | 11/2012 |
| CN | 103044846 A | 4/2013 |
| CN | 103923429 A | 7/2014 |
| DE | 2420358 A1 | 12/1975 |
| DE | 2724360 A1 | 12/1978 |
| JP | 05279549 | * 10/1993 |
| WO | 2004052991 A1 | 6/2004 |
| WO | 2009004018 A1 | 1/2009 |
| WO | 2012022710 A1 | 2/2012 |
| WO | 2014170406 A1 | 10/2014 |
| WO | 2014170407 A1 | 10/2014 |

OTHER PUBLICATIONS

Khan, Molecular Weight of Styrene-Acrylonitrile (SAN) and Styrene-Methyl Methacrylate (SMA) Copolymers; Journal of Polymer Science Polymer Letters Edition, vol. 18 pp. 465-470. (Year: 1980).*

* cited by examiner

*Primary Examiner* — David J Buttner
(74) *Attorney, Agent, or Firm* — J.A. Lindeman & Co. PLLC

(57) ABSTRACT

ABS molding composition comprising: (a) 50 to 80 wt.-% SAN copolymer (a) (S/AN ratio 78:22 to 65:35, $M_w$ 80,000 to 250,000); (b) 8 to 25 wt.-% graft copolymer (b) consisting of 15 to 60 wt.-% graft sheath (b2) and 40 to 85 wt.-% graft substrate—an agglomerated butadiene rubber latex—(b1), obtained by emulsion polymerization of SAN in presence of agglomerated butadiene rubber latex (b1) ($D_{50}$ 150 to 800 nm); and (c) 8 to 30 wt.-% SBC block copolymer (vinylarene 58 to 68 wt.-%) comprising diene/vinylarene tapered polymer blocks; exhibiting ultra-high flow melt with good mechanical properties, a process for their preparation and their use for the production of bulky and/or thin walled articles.

14 Claims, No Drawings

ULTRA-HIGH FLOW ACRYLONITRILE BUTADIENE STYRENE COPOLYMER COMPOSITIONS

The invention is directed to thermoplastic molding compositions based on acrylonitrile-butadiene-styrene (ABS) polymer compounds that exhibit an ultra-high flow with good mechanical properties, a process for their preparation and their use.

Thermoplastic molding compositions based on acrylonitrile-butadiene-styrene (ABS) polymer compounds—composed of SAN copolymers and ABS graft copolymers—are widely used for different applications. ABS polymer compounds are used in automotive industries due to their unique features like dimensional stability, impact strength and ease of processing. In addition to this, ease of painting/electroplating and good aesthetic appearance makes them choice for electronics and household applications. ABS polymer compounds can be used in a wide range of applications in the automotive, household, healthcare etc. segments.

But when the article to be molded is bulky and having thin walled intricate design, it becomes difficult to mold materials comprising conventional ABS polymer compositions, which have a lower melt flow index (MFI) than required to suit to this specific application. Further, there will be internal stress developed in the material making it weaker.

The melt flow index (MFI) is a measure of the mass of polymer that is extruded through a capillary die at a certain temperature and force. Melt Flow Index is an assessment of average molecular mass and is an inverse measure of the melt viscosity. In other words, the higher the MFI, the more polymer flows under test conditions.

As per conventional practice the MFI of the polymer can be improved by use of low molecular weight polymers, wax based additives, lubricants and flow modifiers etc.

Conventional high flow ABS resin compositions (e.g. CN 102108164 A) often rely on SAN matrices having low molecular weights (4.000 to 8.000 g/mol) and a low acrylonitrile (AN) content (25.5 wt.-% or less). This will result in inferior chemical resistance, weatherability and mechanical properties due to a compromise of the AN content and the molecular weight of the SAN matrix. Apparently, the residuals in the polymer grades may increase substantially due to process limitations.

U.S. Pat. No. 8,8389,628 discloses high flow (MFI 32 to 67 g/10 min at 250° C./10 kg load) thermoplastic compositions comprising (A) a SAN resin with epoxy or hydroxyl groups, (B) an ABS resin composed of 5 to 40 wt.-% ABS-graft copolymer (B1) and 60 to 95 wt.-% SAN-copolymer (B2, AN-content 30 to 5 wt.-%) and a polyester (c). Preferred are ABS resins (B) having an AN content of 20 wt.-% or less.

Other prior art high flow ABS resin compositions (e.g. CN 102786767 A, CN 103923429 A) comprise beside ABS graft copolymers and SAN copolymers flow improving additives (e.g. lubricants).

WO 2004/052991 discloses a high flow thermoplastic composition comprising a host polymer such as polycarbonate (PC), PC/ABS or transparent ABS, and a low molecular weight flow modifier polymer based on (meth)acrylates. The flow modifier polymers are not diene-based graft copolymers or other rubber based polymers.

Said conventional flow enhancer additives consisting of low molecular weight polymer or wax often compromise with the mechanical and thermal properties of the ABS or SAN copolymer composition.

Alternatively, the high flow of ABS resin compositions is accomplished by use of halogenated flame retardant additives (e.g. CN 103044846 A). The use of these additives is limited due to the deterioration of the mechanical performance and thermal stability of the composition. In addition, there are limitations on use of halogenated additives.

U.S. Pat. No. 6,096,828 discloses transparent polymer blends comprising styrenic polymers such as polystyrene (all examples), ABS copolymers (not further specified, no example) and SAN-copolymers and a coupled styrene/butadiene block copolymer having a vinyl aromatic content of preferably 65 to 90 wt.-% and comprising at least three consecutive styrene/butadiene tapered blocks. U.S. Pat. No. 6,096,828 is silent about the flow properties of said blends. Said blends of the prior art often are not suitable for applications where high dimensional stability, improved chemical resistance and high stiffness is required along with high flow properties suitable for high throughput molding of large and intricate articles where filling can be an issue due to lower flow of plastic.

Thus, there is still a need of improvement of styrenic polymer compositions for this particular purpose. It is an objective of the instant invention to provide thermoplastic molding compositions based on ABS polymer compounds— with very good flow properties (MFI) without compromising the mechanical and thermal properties of the composition.

One aspect of the invention is a thermoplastic molding composition comprising (or consisting of) components a, b, c and d:
  (a) 50 to 80 wt.-% of at least one copolymer (a) of styrene and acrylonitrile in a weight ratio of from 78:22 to 65:35, preferably 75:25 to 70:30, more preferably 74:26 to 72:28, it being possible for styrene and/or acrylonitrile to be partially (less than 50 wt.-%) replaced by methyl methacrylate, maleic anhydride, N-phenylmaleimide and/or 4-phenylstyrene;
  wherein copolymer (a) has a weight average molar mass $M_w$ of 80,000 to 250,000 g/mol;
  (b) 8 to 25 wt.-% of at least one graft copolymer (b) consisting of 15 to 60 wt.-% of a graft sheath (b2) and 40 to 85 wt.-% of a graft substrate—an agglomerated butadiene rubber latex—(b1), where (b1) and (b2) sum up to 100 wt.-%, obtained by emulsion polymerization of
    styrene and acrylonitrile in a weight ratio of 95:5 to 65:35 to obtain a graft sheath (b2), it being possible for styrene and/or acrylonitrile to be replaced partially (less than 50 wt.-%) by alpha-methylstyrene, methyl methacrylate, maleic anhydride or N-phenylmaleimide or mixtures thereof, in the presence of at least one agglomerated butadiene rubber latex (b1) with a median weight particle diameter $D_{50}$ of 150 to 800 nm,
    where the agglomerated rubber latex (b1) is obtained by agglomeration of at least one starting butadiene rubber latex (s-b1) having a median weight particle diameter $D_{50}$ of equal to or less than 120 nm, preferably equal to or less than 110 nm;
  (c) 8 to 30 wt.-% of at least one coupled conjugated diene/monovinylarene block copolymer (c) comprising one or more conjugated diene/monovinylarene tapered polymer blocks, where—in the final block copolymer—all conjugated diene is incorporated into the tapered polymer block, and—based on the total weight of the final block copolymer—the monovinylarene is present in an amount of 58 to 68 wt.-%, preferably 61 to 64 wt.-%, and the conjugated diene is present in an amount of 32 to 42 wt.-%, preferably 36 to 39 wt.-%; and (d) 0 to 5 wt.-% of further additives and/or processing aids (d);

where the components a, b, c, and, if present d, sum to 100 wt.-%.

Wt.-% means percent by weight.

If component (d) is present, its minimum amount is 0.01 wt.-%, based on the entire thermoplastic molding composition molding compound. Preferred are thermoplastic molding composition according to the invention wherein component (d) is present in an amount of 0.01 to 5 wt.-%, preferably in an amount of 0.1 to 5 wt.-%, more preferably 0.5 to 3 wt.-%.

The term "diene" means a conjugated diene; "butadiene" means 1,3-butadiene.

A diene/monovinylarene polymer block is "tapered" when both (i) the mole fraction of conjugated diene units in a first section of the block is higher than the mole fraction of conjugated diene units in a second section of the block, wherein the second section of the block is closer to a given end of the block, and (ii) condition (i) is true for substantially all sections of the block. Depending on the size of the sections being considered, condition (i) may not be true for all sections, but if so, will be not true at no more than about the level expected by chance.

The weight average molar mass $M_w$ is determined by GPC (solvent: tetrahydrofuran, polystyrene as polymer standard) with UV detection according to DIN 55672-1:2016-03.

The median weight particle diameter $D_{50}$, also known as the $D_{50}$ value of the integral mass distribution, is defined as the value at which 50 wt.-% of the particles have a diameter smaller than the $D_{50}$ value and 50 wt.-% of the particles have a diameter larger than the $D_{50}$ value.

In the present application the weight-average particle diameter $D_w$, in particular the median weight particle diameter $D_{50}$, is determined with a disc centrifuge (e.g.: CPS Instruments Inc. DC 24000 with a disc rotational speed of 24 000 rpm). The weight-average particle diameter $D_w$ is defined by the following formula (see G. Lagaly, O. Schulz and R. Ziemehl, Dispersionen and Emulsionen: Eine Einführung in die Kolloidik feinverteilter Stoffe einschließlich der Tonminerale, Darmstadt: Steinkopf-Verlag 1997, ISBN 3-7985-1087-3, page 282, formula 8.3b):

$$D_w = \mathrm{sum}(n_i * d_i^4)/\mathrm{sum}(n_i * d_i^3)$$

$n_i$: number of particles of diameter $d_i$.

The summation is performed from the smallest to largest diameter of the particles size distribution. It should be mentioned that for a particles size distribution of particles with the same density which is the case for the starting rubber latices and agglomerated rubber latices the volume average particle size diameter Dv is equal to the weight average particle size diameter Dw.

It is preferred that the thermoplastic molding composition comprises (or consists of):

60 to 75 wt-.% component (a),
8 to 20 wt.-% component (b),
8 to 25 wt.-% component (c),
0 to 5 wt.-% component (d), preferably 0.1 to 5 wt.-% component (d).

It is more preferable that the thermoplastic molding composition comprises (or consists of):

60 to 70 wt-.% component (a),
8 to 17 wt.-% component (b),
9 to 22 wt.-% component (c),
0 to 5 wt.-% component (d), preferably 0.1 to 5 wt.-% component (d).

In addition to the components (a), (b), (c) and (d), the inventive thermoplastic molding composition may contain further rubber-free thermoplastic resins (TP) not composed of vinyl monomers, such thermoplastic resins (TP) being used in amounts of up to 1 parts by weight, preferably up to 0.8 parts by weight and particularly preferably up to 0.6 parts by weight (in each case based on 100 parts by weight of the total of (a), (b) and (c)).

The thermoplastic resins (TP) as the rubber-free copolymer in the thermoplastic molding composition according to the invention which can be used in addition to the mentioned components (a), (b), (c) and (d), include for example polycondensation products, for example aromatic polycarbonates, aromatic polyester carbonates, polyesters, polyamides.

Suitable thermoplastic polycarbonates, polyester carbonates, polyesters and polyamides are known and described on pages 14 to 18 of WO 2012/022710.

Preference is given to thermoplastic molding compositions not comprising a further component TP.

Generally the melt flow index (MFI) (determined according to ISO 1133 at 220° C./10 kg load) of the thermoplastic molding compositions according to the invention is in the range of from 60 to 100 g/10 min.

Component (a)

Copolymer (a) (=component (a)) is a copolymer of styrene and acrylonitrile in a weight ratio of from 78:22 to 65:33, preferably 75:25 to 70:30, more preferred 74:26 to 72:28, it being possible for styrene and/or acrylonitrile to be partially (less than 50 wt.-%, preferably less than 20 wt.-%, more preferably less than 10 wt.-%, based on the total amount of monomers used for the preparation of (a)) replaced by methyl methacrylate, maleic anhydride, N-phenylmaleimide and/or 4-phenylstyrene.

It is preferred that styrene and acrylonitrile are not partially replaced by one of the above-mentioned comonomers. Component (a) is preferably a copolymer of styrene and acrylonitrile.

The weight average molar mass $M_w$ of copolymer (a) generally is 80,000 to 250,000 g/mol, preferably 90,000 to 150,000 g/mol, more preferably 90,000 to 120,000 g/mol, most preferred 90,000 to 110,000 g/mol.

The Melt Flow Index (MFI) (ISO 1133 standard, 220° C./10 kg load) of copolymer (a) is preferably in the range from 60 to 80 g/10 min.

Preferably copolymer (a) is a copolymer of styrene and acrylonitrile in a weight ratio of from 74:26 to 72:28 having a weight average molar mass $M_w$ of 90,000 to 120,000 g/mol.

Details relating to the preparation of such copolymers are described, for example, in DE-A 2 420 358, DE-A 2 724 360 and in Kunststoff-Handbuch ([Plastics Handbook], Vieweg-Daumiller, volume V, (Polystyrol [Polystyrene]), Carl-Hanser-Verlag, Munich, 1969, pp. 122 ff., lines 12 ff.). Such copolymers prepared by mass (bulk) or solution polymerization in, for example, toluene or ethylbenzene, have proved to be particularly suitable.

Component (b)

Graft copolymer (b) (component (b)) is known and described e.g. in WO 2012/022710, WO 2014/170406 and WO 2014/170407.

Graft copolymer (b) consists of 15 to 60 wt.-% of a graft sheath (b2) and 40 to 85 wt.-% of a graft substrate—an agglomerated butadiene rubber latex—(b1), where (b1) and (b2) sum up to 100 wt.-%.

Preferably graft copolymer (b) is obtained by emulsion polymerization of styrene and acrylonitrile in a weight ratio of 80:20 to 65:35, preferably 74:26 to 70:30, to obtain a graft sheath (b2), it being possible for styrene and/or acrylonitrile to be replaced partially (less than 50 wt.-%, preferably less than 20 wt.-%, more preferably less than 10 wt.-%, based on the total amount of monomers used for the preparation of (b2)) by alpha-methylstyrene, methyl methacrylate or maleic anhydride or mixtures thereof, in the presence of at least one agglomerated butadiene rubber latex (b1) with a median weight particle diameter $D_{50}$ of 150 to 800 nm, preferably 180 to 700 nm, more preferably 200 to 600 nm, most preferred 250 to 500 nm, in particular preferred 300 to 400 nm.

Preferably the at least one, preferably one, graft copolymer (b) consists of 20 to 50 wt.-% of a graft sheath (b2) and 50 to 80 wt.-% of a graft substrate (b1).

More preferably graft copolymer (b) consists of 30 to 45 wt.-% of a graft sheath (b2) and 55 to 70 wt.-% of a graft substrate (b1).

Most preferably graft copolymer (b) consists of 35 to 45 wt.-% of a graft sheath (b2) and 55 to 65 wt.-% of a graft substrate (b1).

Preferably the obtained graft copolymer (b) has a core-shell-structure; the graft substrate (a1) forms the core and the graft sheath (b2) forms the shell.

Preferably for the preparation of the graft sheath (b2) styrene and acrylonitrile are not partially replaced by one of the above-mentioned comonomers; preferably styrene and acrylonitrile are polymerized alone in a weight ratio of 95:5 to 65:35, preferably 80:20 to 65:35, more preferably 74:26 to 70:30.

The agglomerated rubber latex (b1) may be obtained by agglomeration of at least one starting butadiene rubber latex (s-b1) having a median weight particle diameter $D_{50}$ of equal to or less than 120 nm, preferably equal to or less than 110 nm, with at least one acid anhydride, preferably acetic anhydride or mixtures of acetic anhydride with acetic acid, in particular acetic anhydride, or alternatively, by agglomeration with a dispersion of an acrylate copolymer.

The at least one, preferably one, starting butadiene rubber latex (s-b1) preferably has a median weight particle diameter $D_{50}$ of equal to or less than 110 nm, particularly equal to or less than 87 nm.

The term "butadiene rubber latex" means polybutadiene latices produced by emulsion polymerization of butadiene and less than 50 wt.-% (based on the total amount of monomers used for the production of polybutadiene polymers) of one or more monomers that are copolymerizable with butadiene as comonomers.

Examples for such monomers include isoprene, chloroprene, acrylonitrile, styrene, alpha-methylstyrene, $C_1$-$C_4$-alkylstyrenes, $C_1$-$C_8$-alkylacrylates, $C_1$-$C_8$-alkylmethacrylates, alkyleneglycol diacrylates, alkylenglycol dimethacrylates, divinylbenzol; preferably, butadiene is used alone or mixed with up to 30 wt.-%, preferably up to 20 wt.-%, more preferably up to 15 wt.-% styrene and/or acrylonitrile, preferably styrene.

Preferably the starting butadiene rubber latex (s-b1) consists of 70 to 99 wt.-% of butadiene and 1 to 30 wt.-% styrene.

More preferably the starting butadiene rubber latex (s-b1) consists of 85 to 99 wt.-% of butadiene and 1 to 15 wt.-% styrene.

Most preferably the starting butadiene rubber latex (s-b1) consists of 85 to 95 wt.-% of butadiene and 5 to 15 wt.-% styrene.

The agglomerated rubber latex (graft substrate) (b1) may be obtained by agglomeration of the above-mentioned starting butadiene rubber latex (s-b1) with at least one acid anhydride, preferably acetic anhydride or mixtures of acetic anhydride with acetic acid, in particular acetic anhydride.

The preparation of graft copolymer (b) is described in detail in WO 2012/022710 A1. It can be prepared by a process comprising the steps: α) synthesis of starting butadiene rubber latex (s-b1) by emulsion polymerization, β) agglomeration of latex (s-b1) to obtain the agglomerated butadiene rubber latex (b1) and γ) grafting of the agglomerated butadiene rubber latex (b1) to form a graft copolymer (b).

The synthesis (step a)) of starting butadiene rubber latices (s-b1) is described in detail on pages 5 to 8 of WO 2012/022710 A1.

Preferably the starting butadiene rubber latices (s-b1) are produced by an emulsion polymerization process using metal salts, in particular persulfates (e.g. potassium persulfate), as an initiator and a rosin-acid based emulsifier.

As resin or rosin acid-based emulsifiers, those are being used in particular for the production of the starting rubber latices by emulsion polymerization that contain alkaline salts of the rosin acids. Salts of the resin acids are also known as rosin soaps. Examples include alkaline soaps as sodium or potassium salts from disproportionated and/or dehydrated and/or hydrated and/or partially hydrated gum rosin with a content of dehydroabietic acid of at least 30 wt.-% and preferably a content of abietic acid of maximally 1 wt.-%. Furthermore, alkaline soaps as sodium or potassium salts of tall resins or tall oils can be used with a content of dehydroabietic acid of preferably at least 30 wt.-%, a content of abietic acid of preferably maximally 1 wt.-% and a fatty acid content of preferably less than 1 wt.-%.

Mixtures of the aforementioned emulsifiers can also be used for the production of the starting rubber latices. The use of alkaline soaps as sodium or potassium salts from disproportionated and/or dehydrated and/or hydrated and/or partially hydrated gum rosin with a content of dehydroabietic acid of at least 30 wt.-% and a content of abietic acid of maximally 1 wt.-% is advantageous.

Preferably the emulsifier is added in such a concentration that the final particle size of the starting butadiene rubber latex (s-b1) achieved is from 60 to 110 nm (median weight particle diameter $D_{50}$).

Polymerization temperature in the preparation of the starting rubber latices (s-b1) is generally 25° C. to 160° C., preferably 40° C. to 90° C. Further details to the addition of the monomers, the emulsifier and the initiator are described in WO 2012/022710. Molecular weight regulators, salts, acids and bases can be used as described in WO 2012/022710.

Then the obtained starting butadiene rubber latex (s-b1) is subjected to agglomeration (step β)) to obtain agglomerated rubber latex (b1).

The agglomeration with at least one acid anhydride is described in detail on pages 8 to 12 of WO 2012/022710 A1.

Preferably acetic anhydride, more preferably in admixture with water, is used for the agglomeration. Preferably the agglomeration step β) is carried out by the addition of 0.1 to 5 parts by weight of acetic anhydride per 100 parts of the starting rubber latex solids.

The agglomerated rubber latex (b1) is preferably stabilized by addition of further emulsifier while adjusting the pH value of the latex (b1) to a pH value (at 20° C.) between pH 7.5 and pH 11, preferably of at least 8, particular preferably of at least 8.5, in order to minimize the formation of coagulum and to increase the formation of a stable agglomerated rubber latex (b1) with a uniform particle size. As further emulsifier preferably rosin-acid based emulsifiers as described above in step a) are used. The pH value is adjusted by use of bases such as sodium hydroxide solution or preferably potassium hydroxide solution.

The obtained agglomerated rubber latex (b1) has a median weight particle diameter $D_{50}$ of generally 150 to 800 nm, preferably 180 to 700 nm, more preferably 200 to 600 nm, most preferred 250 to 500 nm, in particular preferred 300 to 400 nm. The agglomerated latex rubber latex (b1) obtained according to this method is preferably monomodal.

Alternatively the agglomeration can be done by adding a dispersion of an acrylate polymer.

Preference is given to the use of dispersions of copolymers of $C_1$ to $C_4$-alkyl acrylates, preferably of ethyl acrylate, with from 0.1 to 10% by weight of monomers which form polar polymers, examples being acrylic acid, methacrylic acid, acrylamide, methacrylamide, N-methylol methacrylamide and N-vinylpyrrolidone. Particular preference is given to a copolymer of 92 to 98 wt.-% of ethyl acrylate and 2 to 8 wt.-% of methacrylamide. The agglomerating dispersion may, if desired, also contain more than one of the acrylate polymers mentioned.

In general, the concentration of the acrylate polymers in the dispersion used for agglomeration should be from 3 to 40% by weight. For the agglomeration, from 0.2 to 20 parts by weight, preferably from 1 to 5 parts by weight, of the agglomerating dispersion are used for each 100 parts of the rubber latex, the calculation in each case being based on solids. The agglomeration is carried out by adding the agglomerating dispersion to the rubber. The addition rate is usually not critical, and the addition usually takes from 1 to 30 minutes at from 20 to 90° C., preferably from 30 to 75° C.

Acrylate copolymers having a polydispersity U of less than 0.27 and a $d_{50}$ value of from 100 to 150 nm are preferably used for the agglomeration. Such acrylate copolymers are described in detail on pages 8 to 14 of WO 2014/170406.

In case of agglomeration with a dispersion of an acrylate copolymer generally the obtained graft substrate (b1) has a bimodal particle size distribution of nonagglomerated particles having a $d_{50}$ value in the range of from 80 to 120 nm and of agglomerated particles having a $d_{50}$ value in the range of 150 to 800 nm, preferably 180 to 700 nm, more preferably 200 to 600 nm, most preferred 250 to 500 nm.

In step γ) the agglomerated rubber latex (b1) is grafted to form the graft copolymer (A). Suitable grafting processes are described in detail on pages 12 to 14 of WO 2012/022710.

Graft copolymer (b) is obtained by emulsion polymerization of styrene and acrylonitrile—optionally partially replaced by alpha-methylstyrene, methyl methacrylate and/or maleic anhydride—in a weight ratio of 95:5 to 65:35 to obtain a graft sheath (b2) (in particular a graft shell) in the presence of the above-mentioned agglomerated butadiene rubber latex (b1).

Preferably graft copolymer (b) has a core-shell-structure.

The grafting process of the agglomerated rubber latex (b1) of each particle size is preferably carried out individually.

Preferably the graft polymerization is carried out by use of a redox catalyst system, e.g. with cumene hydroperoxide or tert.-butyl hydroperoxide as preferable hydroperoxides. For the other components of the redox catalyst system, any reducing agent and metal component known from literature can be used.

According to a preferred grafting process which is carried out in presence of at least one agglomerated butadiene rubber latex (b1) with a median weight particle diameter $D_{50}$ of preferably 280 to 350 nm, more preferably 300 to 330 nm, in an initial slug phase 15 to 40 wt.-%, more preferably 26 to 30 wt.-%, of the total monomers to be used for the graft sheath (b2) are added and polymerized, and this is followed by a controlled addition and polymerization of the remaining amount of monomers used for the graft sheath (b2) till they are consumed in the reaction to increase the graft ratio and improve the conversion. This leads to a low volatile monomer content of graft copolymer (b) with better impact transfer capacity.

Further details to polymerization conditions, emulsifiers, initiators, molecular weight regulators used in grafting step γ) are described in WO 2012/022710.

Component (c)

Component (c) is at least one, preferably one, coupled conjugated diene/monovinylarene block copolymer (c) comprising one or more conjugated diene/monovinylarene tapered polymer blocks, where—in the final block copolymer—all conjugated diene is incorporated into the tapered blocks, and—based on the total weight of the final block copolymer—the monovinylarene is present in an amount of 58 to 68 wt.-%, preferably 61 to 64 wt.-%, and the conjugated diene is present in an amount of 32 to 42 wt.-%, preferably 36 to 39 wt.-%.

Preferably component (c) is at least one, preferably one, coupled conjugated diene/monovinylarene block copolymer (c) comprising at least three consecutive conjugated diene/monovinylarene tapered polymer blocks.

As used herein, consecutive means three sequential tapered polymer blocks with no intervening homopolymer blocks. As mentioned above the tapered polymer blocks contain a mixture of monovinylarene and conjugated diene.

The basic starting materials and polymerization conditions for preparing conjugated diene/monovinylarene block copolymers are disclosed in U.S. Pat. Nos. 4,091,053; 4,584,346; 4,704,434; 4,704,435; 5,227,419 and 6,096,828.

Suitable conjugated dienes which can be used in the block copolymers include those having 4 to 12 carbon atoms per molecule, with those having 4 to 8 carbon atoms preferred. Examples of such suitable compounds include 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof. The preferred dienes are 1,3-butadiene and isoprene, more preferably 1,3-butadiene.

Suitable monovinylarene compounds which can be used in the block copolymers include those having 8 to 18 carbon atoms per molecule, preferably 8 to 12 carbon atoms. Examples of such suitable compounds include styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)-styrene, 1-vinylnaphthalene, 2-vinylnaphthalene, and mixtures thereof. Styrene is the preferred monovinylarene compound.

Preferably the monovinylarene monomer is present in the final block copolymer in an amount of from 61 to 64 weight percent based on the total weight of the final block copolymer.

Preferably the conjugated diene monomer is present in the final block copolymer in an amount of from 36 to 39 weight percent based on the total weight of the final block copolymer.

Preferably the block copolymer contains at least three consecutive conjugated diene/monovinylarene tapered polymer blocks, which are incorporated sequentially into the block copolymer with no intervening homopolymer blocks.

The amount of each monomer in the tapered polymer block can vary broadly depending on the particular characteristics desired. Generally monovinylarene will be present in each tapered polymer block in an amount of from 2 to 18 weight percent based on the total weight of the final block copolymer, preferably from 3 to 16 weight percent.

Generally the conjugated diene will be present in each tapered polymer block in an amount of from 8 to 17 weight percent based on the total weight of the final block copolymer, preferably from 9 to 16 weight percent.

All conjugated diene monomer present in the final block copolymer is incorporated into the tapered polymer blocks.

The relative amount of each monomer in the tapered polymer block can also vary broadly depending on the particular characteristics desired. Preferably the conjugated diene will be present in each tapered polymer block in an amount of from 0.6 parts to 4 parts per part monovinylarene in the tapered polymer block, more preferably from about 0.7 parts to about 3.5 parts per part monovinylarene.

The amount of initiator employed depends upon the desired polymer or incremental block molecular weight, as is known in the art, and is readily determinable, making due allowance for traces of poisons in the feed streams. Generally the initiator will be present in an amount in the range of from about 0.01 phm (parts by weight per hundred parts by weight of total monomer) to about 1.0 phm, preferably about 0.01 phm to about 0.5 phm, and more preferably from 0.01 phm to 0.2 phm.

Small amounts of polar organic compounds, such as ethers, thioethers, and tertiary amines can be employed in the hydrocarbon diluent to improve the effectiveness of the initiator and to randomize at least part of the monovinylarene monomer in a mixed monomer charge. Tetrahydrofuran is currently preferred. When employed, the polar organic compound is present in an amount sufficient to improve the effectiveness of the initiator. For example, when employing tetrahydrofuran to improve the effectiveness of the initiator, the tetrahydrofuran is generally present in an amount in the range of from about 0.01 to about 1.0 phm, preferably from about 0.02 to about 1.0 phm.

The polymerization process is carried out in a hydrocarbon diluent at any suitable temperature in the range of from −100° C. to 150° C., preferably from 0° C. to 150° C., at pressures sufficient to maintain the reaction mixture substantially in the liquid phase. Preferred hydrocarbon diluents include linear or cycloparaffins or mixtures thereof. Typical examples include pentane, hexane, octane, cyclopentane, cyclohexane, and mixtures thereof. Cyclohexane is presently preferred. The polymerization is carried out in a substantial absence of oxygen and water, preferably under an inert gas atmosphere.

Each monomer charge or monomer mixture charge is polymerized under solution polymerization conditions such that the polymerization of each monomer charge or monomer mixture charge is substantially complete before charging a subsequent charge.

Typical initiator, monomer and monomer mixture charge sequences include, but are not limited to the following:

Mode A
(i) monovinylarene monomer and initiator,
(ii) monovinylarene monomer and initiator,
(iii) conjugated diene/monovinylarene monomer mixture, and
(iv) coupling agent;

Mode B
(i) monovinylarene monomer and initiator,
(ii) monovinylarene monomer and initiator,
(iii) conjugated diene/monovinylarene monomer mixture,
(iv) conjugated diene/monovinylarene monomer mixture, and
(v) coupling agent;

Mode C
(i) monovinylarene monomer and initiator,
(ii) monovinylarene monomer and initiator,
(iii) conjugated diene/monovinylarene monomer mixture,
(iv) conjugated diene/monovinylarene monomer mixture,
(v) conjugated diene/monovinylarene monomer mixture, and
(vi) coupling agent;

Mode D
(i) monovinylarene monomer and initiator,
(ii) monovinylarene monomer and initiator,
(iii) conjugated diene/monovinylarene monomer mixture,
(iv) conjugated diene/monovinylarene monomer mixture,
(v) conjugated diene/monovinylarene monomer mixture,
(vi) conjugated diene/monovinylarene monomer mixture, and
(vii) coupling agent;

Mode E
(i) monovinylarene monomer and initiator,
(ii) monovinylarene monomer and initiator,
(iii) conjugated diene/monovinylarene monomer mixture,
(iv) conjugated diene/monovinylarene monomer mixture,
(v) conjugated diene/monovinylarene monomer mixture,
(vi) conjugated diene/monovinylarene monomer mixture,
(vii) conjugated diene/monovinylarene monomer mixture, and
(viii) coupling agent.

Mode F
(i) monovinylarene monomer and initiator,
(ii) conjugated diene/monovinylarene monomer mixture and initiator,
(iii) conjugated diene/monovinylarene monomer mixture,
(iv) conjugated diene/monovinylarene monomer mixture, and
(v) coupling agent;

Mode G
(i) monovinylarene monomer and initiator,
(ii) conjugated diene/monovinylarene monomer mixture and initiator,
(iii) conjugated diene/monovinylarene monomer mixture,
(iv) conjugated diene/monovinylarene monomer mixture,
(v) conjugated diene/monovinylarene monomer mixture, and
(vi) coupling agent;

Mode H
(i) monovinylarene monomer and initiator,
(ii) conjugated diene/monovinylarene monomer mixture and initiator,
(iii) conjugated diene/monovinylarene monomer mixture,
(iv) conjugated diene/monovinylarene monomer mixture,
(v) conjugated diene/monovinylarene monomer mixture,
(vi) conjugated diene/monovinylarene monomer mixture, and
(vii) coupling agent.

The monomer mixture can be premixed and charged as a mixture or the monomers can be charged simultaneously. In step (i) the initiator can be added before or after the monovinylarene monomer charge. In large scale operations it may be desirable to add the monovinylarene monomer before adding the initiator in step (i). In subsequent steps containing initiator, the initiator should be added prior to the monomer or monomer mixture.

Prior to coupling, typical polymer chains prepared by the above described sequential polymerizations include the following:

Mode A
S1-S2-B1/S3-Li
S2-B1/S3-Li
Mode B
S1-S2-B1/S3-B2/S4-Li
S2-B1/S3-B2/S4-Li
Mode C
S1-S2-B1/S3-B2/S4-B3/S5-Li
S2-B1/S3-B2/S4-B3/S5-Li
Mode D
S1-S2-B1/S3-B2/S4-B3/S5-B4/S6-Li
S2-B1/S3-B2/S4-B3/S5-B4/S6-Li
Mode E
S1-S2-B1/S3-B2/S4-B3/S5-B4/S6-B5/S7-Li
S2-B1/S3-B2/S4-B3/S5-B4/S6-B5/S7-Li
Mode F
S1-B1/S2-B2/S3-B3/S4-Li
B1/S2-B2/S3-B3/S4-Li
Mode G
S1-B1/S2-B2/S3-B3/S4-B4/S5-Li
B1/S2-B2/S3-B3/S4-B4/S5-Li
Mode H
S1-B1/S2-B2/S3-B3/S4-B4/S5-B5/S6-Li
B1/S2-B2/S3-B3/S4-B4/S5-B5/S6-Li where S1 and S2 are monovinylarene blocks, blocks B1/S2, B2/S3 etc. are tapered blocks containing a mixture of monovinylarene and conjugated diene, and Li is a residue from a monoalkali metal initiator.

Preferably Polymer Chains
(X) S1-S2-B1/S3-B2/S4-B3/S5-Li
(Y) S2-B1/S3-B2/S4-B3/S5-Li
according to Mode C are prepared.

In particular preferred block copolymers (c) comprise (or consist of) at least one polymer chain (X') of the formula S1-S2-B1/S3-B2/S4-B3/S5~, wherein S1, S2, B1/S3, B2/S4, B3/S5 are as hereinbefore defined and ~ is the bond to the coupling agent.

In formulas (X) and (Y), the total weight of blocks $S^1$ and $S^2$ can be from 30 wt. % to 70 wt. % (or preferably from 35 wt. % to 65 wt. %) of X, and $S^2$ can be from 15 wt. % to 45 wt. % (or preferably from 17 wt. % to 40 wt. %) of Y.

The number average molecular weight Mn of the polymer chain (X) or (X')—before coupling—is preferably 65.000 to 100.000 g/mol.

The number average molecular weight Mn of block S1 of the polymer chain (X) is preferably 20.000 to 40.000 g/mol.

The number average molecular weight Mn of block S2 of the polymer chain (X) is preferably 10.000 to 20.000 g/mol.

The number average molar weight $M_n$ is determined by GPC (solvent: tetrahydrofuran, polystyrene as polymer standard) with UV detection according to DIN 55672-1:2016-03.

The coupling agent is added after polymerization is complete. Suitable coupling agents include the di- or multivinylarene compounds, di- or multiepoxides, di- or multiisocyanates, di- or multiimines, di- or multialdehydes, di- or multiketones, alkoxytin compounds, di- or multihalides, particularly silicon halides and halosilanes, mono-, di-, or multianhydrides, di-, or multiesters, preferably the esters of monoalcohols with polycarboxylic acids, diesters which are esters of monohydric alcohols with dicarboxylic acids, diesters which are esters of monobasic acids with polyalcohols such as glycerol, and the like, and mixtures of two or more such compounds.

Useful multifunctional coupling agents include epoxidized vegetable oils such as epoxidized soybean oil, epoxidized linseed oil and the like or mixtures thereof. The presently preferred coupling agent is epoxidized vegetable oil. Presently preferred is epoxidized soybean oil.

Any effective amount of the coupling agent can be employed. While the amount is not believed to be critical, generally a stoichiometric amount relative to the active polymer alkali metal tends to promote maximum coupling. However, more or less than stoichiometric amounts can be used for varying coupling efficiency where desired for particular products. Typically the total amount of coupling agent employed in the polymerization is in the range of from about 0.1 phm to about 20 phm, preferably from about 0.1 phm to about 5 phm, and more preferably 0.1 phm to 2 phm.

Following completion of the coupling reaction, the polymerization reaction mixture can be treated with a terminating agent such as water, alcohol, phenols or linear saturated aliphatic mono-dicarboxylic acids to remove alkali metal from the block copolymer and for color control. The preferred terminating agent is water and carbon dioxide.

The polymer cement (polymer in polymerization solvent) usually contains about 10 to 40 weight percent solids, more usually 20 to 35 weight percent solids. The polymer cement can be flashed to evaporate a portion of the solvent so as to increase the solids content to a concentration of about 50 to about 99 weight percent solids, followed by vacuum oven or devolatilizing extruder drying to remove the remaining solvent.

Suitable block copolymers (c) are commercially available as K-resins KR20 and KRDEV034A from Ineos Styrolution GmbH, Germany.

Component (d)

Various additives and/or processing aids (d) (=component (d)) may be added to the molding compounds according to the invention in amounts of from 0.01 to 5 wt.-% as assistants and processing additives. Suitable additives and/or processing aids (d) include all substances customarily employed for processing or finishing the polymers.

Examples include, for example, dyes, pigments, colorants, fibers/fillers, antistats, antioxidants, stabilizers for improving thermal stability, stabilizers for increasing photostability, stabilizers for enhancing hydrolysis resistance and chemical resistance, antithermal decomposition agents, dispersing agents, and in particular external/internal lubricants that are useful for production of molded bodies/articles.

These additives and/or processing aids may be admixed at any stage of the manufacturing operation, but preferably at an early stage in order to profit early on from the stabilizing effects (or other specific effects) of the added substance.

Preferably component (d) is at least one lubricant, antioxidant and/or pigment.

Suitable lubricants/glidants and demolding agents include stearic acids, stearyl alcohol, stearic esters, amide waxes (bisstearylamide, in particular ethylenebisstearamide), polyolefin waxes and/or generally higher fatty acids, derivatives thereof and corresponding fatty acid mixtures comprising 12 to 30 carbon atoms.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof.

It is also possible to use mixtures of different antioxidants. It is possible in principle to use any compounds which are customary in the trade or suitable for styrene copolymers, for example antioxidants from the Irganox range. In addition to the phenolic antioxidants cited above by way of example, it is also possible to use socalled costabilizers, in particular phosphorus- or sulfur-containing costabilizers.

These phosphorus- or sulfur-containing costabilizers are known to those skilled in the art.

For further additives and/or processing aids, see, for example "Plastics Additives Handbook", Hans Zweifel, 6th edition, Hanser Publ., Munich, 2009. Specific examples of suitable additives and/or processing aids are mentioned on pages 23 to 26 of WO 2014/170406.

Preparation of Thermoplastic Molding Composition

The thermoplastic molding composition of the invention may be produced from the components (a), (b), (c) and, if present (d), and optionally further polymers (TP) by any known method. However, it is preferable when the components are premixed and blended by melt mixing, for example conjoint extrusion, preferably with a twin-screw extruder, kneading or rolling of the components. The melt mixing is generally done at temperatures in the range of from 180° C. to 250° C., preferably from 190° C. to 220° C.

The thermoplastic molding compositions according to the invention have high melt flow rates (MFI)—often in the range of 60 to 100 g/10 min (ISO 1133, 220° C./10 kg load)—and can be processed easily and are suitable for the preparation of bulky and/or thin walled articles. They have further good mechanical and thermal properties. Moreover, the content of residual monomer of the inventive compositions is very low.

A further subject of the invention is the use of the inventive thermoplastic molding composition for the production of shaped articles, in particular bulky and/or thin walled articles.

Processing may be carried out using the known processes for thermoplast processing, in particular production may be effected by thermoforming, extruding, injection molding, calendaring, blow molding, compression molding, press sintering, deep drawing or sintering; injection molding is preferred.

Preferred is the use of the thermoplastic molding composition according to the invention for applications in the automotive, household or healthcare sector, preferably for high throughput molding machines, in particular for bulky and/or thin walled intricate articles, such as cooler bodies and casings of washing machines, dryers, air conditioners or mobile phones and large decorative items, where filling is an issue due to lower flow.

The invention is further illustrated by the examples and the claims.

EXAMPLES

Test Methods

Molar Mass $M_w$

The weight average molar mass $M_w$ is determined by GPC (solvent: tetrahydrofuran, polystyrene as polymer standard) with UV detection according to DIN 55672-1:2016-03.

Melt Flow Index (MFI) or Melt Volume Flow Rate (MFR)

MFI/MFR tests of the blends were performed according to ISO 1133 standard at 220° C./10 kg load and at 200° C./5 kg load by use of a MFI-machine of CEAST, Italy.

Notched Izod Impact Strength (NIIS) Test

Izod impact tests were performed on notched specimens (ASTM D 256 standard) using an instrument of CEAST, Italy.

Tensile Strength (TS) and Tensile Modulus (TM) Test

Tensile tests (ISO 527) of the blends were carried out at 23° C. using an Universal testing Machine (UTM) of Instron, UK.

Flexural Strength (FS) and Flexural Modulus (FM) Test

Flexural test of the blends (ISO 178) was carried out at 23° C. using a UTM of Lloyd Instruments, UK.

Heat deflection temperature (HDT)

Heat deflection temperature test was performed on injection molded specimen (ASTM D 648 standard) using a Zwick Roell GmbH instrument.

VICAT Softening Temperature (VST)

Vicat softening temperature test was performed on injection molded test specimen (ASTM D 1525-09 standard) using a Zwick Roell GmbH machine. Test is carried out at a heating rate of 120° C./hr (Method B) at 50 N loads.

Rockwell Hardness (RH)

Hardness of the injection molded test specimen (ISO-2039/2-11) was tested using a Rockwell hardness tester.

Materials used:

Component (a)

Statistical copolymer (a-1) from styrene and acrylonitrile with a ratio of polymerized styrene to acrylonitrile of 73:27 with a weight average molecular weight Mw of 100,000 g/mol and a melt volume flow rate (MVR) (220° C./10 kg load) of 75 g/10 minutes, produced by free radical solution polymerization.

Component (b)

Fine-Particle Butadiene Rubber Latex (s-b1)

The fine-particle butadiene rubber latex (s-b1) which is used for the agglomeration step was produced by emulsion polymerization using tert-dodecylmercaptan as chain transfer agent and potassium persulfate as initiator at temperatures from 60° to 80° C. The addition of potassium persulfate marked the beginning of the polymerization. Finally the fine-particle butadiene rubber latex (s-b1) was cooled below 50° C. and the non reacted monomers were removed partially under vacuum (200 to 500 mbar) at temperatures below 50° C. which defines the end of the polymerization. Then the latex solids (in % per weight) were determined by evaporation of a sample at 180° C. for 25 min. in a drying cabinet. The monomer conversion is calculated from the measured latex solids. The butadiene rubber latex (s-b1) is characterized by the following parameters, see table 1.

Latex s-b1-1

No seed latex is used. As emulsifier the potassium salt of a disproportionated rosin (amount of potassium dehydroabietate: 52 wt.-%, potassium abietate: 0 wt.-%) and as salt tetrasodium pyrophosphate is used.

TABLE 1

Composition of the butadiene rubber latex s-b1

| Latex | s-b1-1 |
|---|---|
| Monomer butadiene/styrene | 90/10 |
| Seed Latex (wt.-% based on monomers) | ./. |
| Emulsifier (wt.-% based on monomers) | 2.80 |
| Potassium Persulfate (wt.-% based on monomers) | 0.10 |
| Decomposed Potassium Persulfate (parts per 100 parts latex solids) | 0.068 |
| Salt (wt.-% based on monomers) | 0.559 |
| Salt amount relative to the weight of solids of the rubber latex | 0.598 |
| Monomer conversion (%) | 89.3 |
| Dw (nm) | 87 |
| pH | 10.6 |
| Latex solids content (wt.-%) | 42.6 |
| K | 0.91 |

$$K = W*(1 - 10.4*S)*Dw$$

W=decomposed potassium persulfate [parts per 100 parts rubber]
S=salt amount in percent relative to the weight of solids of the rubber latex
Dw=weight average particle size (=median particle diameter $D_{50}$) of the fine-particle butadiene rubber latex (s-b1)

Production of the Coarse-Particle, Agglomerated Butadiene Rubber Latices (b1)

The production of the coarse-particle, agglomerated butadiene rubber latices (b1) was performed with the specified amounts mentioned in table 2. The fine-particle butadiene rubber latex (s-b1) was provided first at 25° C. and was adjusted if necessary with deionized water to a certain concentration and stirred. To this dispersion an amount of acetic anhydride based on 100 parts of the solids from the fine-particle butadiene rubber latex (s-b1) as fresh produced aqueous mixture with a concentration of 4.58 wt.-% was added and the total mixture was stirred for 60 seconds. After this the agglomeration was carried out for 30 minutes without stirring. Subsequently KOH was added as a 3 to 5 wt.-% aqueous solution to the agglomerated latex and mixed by stirring. After filtration through a 50 μm filter the amount of coagulate as solid mass based on 100 parts solids of the fine-particle butadiene rubber latex (s-b1) was determined. The solid content of the agglomerated butadiene rubber latex (b1), the pH value and the median weight particle diameter $D_{50}$ was determined.

TABLE 2

Production of the coarse-particle, agglomerated butadiene rubber latices (b1)

| latex b1 | | b1-1 | b1-2 |
|---|---|---|---|
| used latex s-b1 | | s-b1-1 | s-b1-1 |
| concentration latex s-b1 before agglomeration | wt.-% | 37.4 | 37.4 |
| amount acetic anhydride | parts | 0.90 | 0.91 |
| amount KOH | parts | 0.81 | 0.82 |
| concentration KOH solution | wt.-% | 3 | 3 |
| solid content latex A1 | wt.-% | 32.5 | 32.5 |
| coagulate | parts | 0.01 | 0.00 |
| pH | | 9.0 | 9.0 |
| $D_{50}$ | nm | 315 | 328 |

Production of the Graft Copolymers (b) 59.5 wt.-parts of mixtures of the coarse-particle, agglomerated butadiene rubber latices b1-1 and b1-2 (ratio 50:50, calculated as solids of the rubber latices (b1)) were diluted with water to a solid content of 27.5 wt.-% and heated to 55° C. 40.5 wt.-parts of a mixture consisting of 72 wt.-parts styrene, 28 wt.-parts acrylonitrile and 0.4 wt.-parts tertdodecylmercaptan were added in 3 hours 30 minutes. At the same time when the monomer feed started the polymerization was started by feeding 0.15 wt.-parts cumene hydroperoxide together with 0.57 wt.-parts of a potassium salt of disproportionated rosin (amount of potassium dehydroabietate: 52 wt.-%, potassium abietate: 0 wt.-%) as aqueous solution and separately an aqueous solution of 0.22 wt.-parts of glucose, 0.36 wt.-% of tetrasodium pyrophosphate and 0.005 wt.-% of iron-(II)-sulfate within 3 hours 30 minutes. The temperature was increased from 55 to 75° C. within 3 hours 30 minutes after start feeding the monomers. The polymerization was carried out for further 2 hours at 75° C. and then the graft rubber latex (=graft copolymer (b)) was cooled to ambient temperature. The graft rubber latex was stabilized with ca. 0.6 wt.-parts of a phenolic antioxidant and precipitated with sulfuric acid, washed with water and the wet graft powder was dried at 70° C. (residual humidity less than 0.5 wt.-%). The obtained product is graft copolymer (b-1).

Component (c)

c-1: K-Resin® KR20, a styrene butadiene block copolymer (styrene content 62 wt.-%) from Ineos Styrolution, Germany.

c-2: K-Resin® KRDEV034A, a styrene butadiene block copolymer (styrene content 62 wt.-%) from Ineos Styrolution, Germany.

Component (d)

| d-1 | Ethylene bis stearamide |
|---|---|
| d-2 | Polydimethyl siloxane |
| d-3 | Distearyl pentaeritritol diphosphite (SPEP) |
| d-4 | Magnesium stearate |
| d-5 | Magnesium oxide |

Thermoplastic Molding Compositions

SAN-copolymer (a-1), graft copolymer (b-1), and SBC-block copolymer (c-1) or (c-2), and the afore-mentioned components (d) were mixed (composition see Table 3, batch size 5 kg) for 2 minutes in a high speed mixer to obtain good dispersion and a uniform premix and then said premix was melt blended in a twin-screw extruder at a speed of 80 rpm and using an incremental temperature profile from 190 to 220° C. for the different barrel zones. The extruded strands were cooled in a water bath, air-dried and pelletized. Standard test specimens of the obtained blend were injection molded at a temperature of 190 to 230° C. and test specimens were prepared.

TABLE 3

Composition (in wt.-%) of Tested Blends

| | Example No. | | | | |
|---|---|---|---|---|---|
| | 1 | 2* | 3 | 4 | 5 |
| Components | | | | | |
| b-1 | 19.6 | 24.5 | 9.8 | 14.7 | 14.7 |
| a-1 | 68.5 | 73.4 | 68.5 | 68.5 | 63.6 |
| c-1 | — | — | 19.6 | 14.7 | 19.6 |
| c-2 | 9.8 | — | — | — | — |
| Additives | | | | | |
| (d-1) | 1.47 | 1.47 | 1.47 | 1.47 | 1.47 |
| (d-2) | 0.15 | 0.15 | 0.15 | 0.15 | 0.15 |
| (d-3) | 0.15 | 0.15 | 0.15 | 0.15 | 0.15 |

TABLE 3-continued

Composition (in wt.-%) of Tested Blends

| | Example No. | | | | |
|---|---|---|---|---|---|
| | 1 | 2* | 3 | 4 | 5 |
| (d-4) | 0.29 | 0.29 | 0.29 | 0.29 | 0.29 |
| (d-5) | 0.10 | 0.10 | 0.10 | 0.10 | 0.10 |

*composition not according to claims

The residual monomer and solvent content and the mechanical, thermal and flow properties of the tested blends are presented in Tables 4 and 5.

TABLE 4

Residual Monomer Analysis

| Example | Monomer/solvent (ppm) | | | |
|---|---|---|---|---|
| No. | AN | Toluene | Ethylbenzene | Styrene |
| 2* | 20 | 117 | 15 | 1067 |
| 3 | 20 | 105 | 11 | 567 |
| 4 | 19 | 103 | 13 | 737 |
| 5 | 16 | 89 | 0 | 640 |

The residual monomer and solvent content of the inventive examples 3 to 5 is lower compared to the comparative example 2* without SBC block copolymers.

TABLE 5

Property Profile of Tested Blends

| | | Example No. | | | | |
|---|---|---|---|---|---|---|
| Properties | Unit | 1 | 2* | 3 | 4 | 5 |
| BY FTIR | % AN | 24.9 | 24.8 | 24.9 | 24.5 | 21.2 |
| | % BD | 12.8 | 12.2 | 11.6 | 12.8 | 14.3 |
| | % ST | 62.3 | 63.0 | 63.5 | 62.7 | 64.5 |
| Melt Flow Rate | g/10 min | 61 | 39 | 98 | 75 | 85 |
| Notched Izod Impact Strength 6.4 mm | kg · cm/cm | 21.5 | 16 | 5 | 10 | 11 |
| Notched Izod Impact Strength 3.2 mm | kg · cm/cm | 26 | 23.5 | 5 | 15.5 | 15 |
| Tensile Strength | kg/cm$^2$ | 475 | 500 | 510 | 490 | 435 |
| Tensile Modulus | kg/cm$^2$ | 27775 | 29200 | 30199 | 29387 | 27250 |
| Elongation at Break | % | 32 | 26 | 25 | 33 | 40 |
| Flexural Strength | kg/cm$^2$ | 767 | 832 | 815 | 817 | 739 |
| Flexural Modulus | kg/cm$^2$ | 26154 | 29100 | 28081 | 28325 | 25196 |
| Rockwell Hardness | R-Scale | 103 | 108 | 103 | 105 | 100 |
| HDT, 1.8 MPa, annealed | °C. | 98 | 100 | 99 | 97 | 100 |
| VST | °C. | 96 | 101 | 94 | 95 | 93 |

The blend according to example 3 shows a very high Melt Flow Rate of 98 g/10 min which is extraordinary in comparison to ABS blends of the prior art. Moreover, said blend shows sufficient impact and other mechanical and thermal properties required for applications in the automotive, household and healthcare sector.

The invention claimed is:
1. A thermoplastic molding composition comprising components a, b, c, and d:
  (a) 50 to 80 wt.-% of at least one copolymer (a) of styrene and acrylonitrile in a weight ratio of from 78:22 to 65:35, wherein the styrene and/or acrylonitrile is optionally partially replaced by methyl methacrylate, maleic anhydride, N-phenylmaleimide, and/or 4-phenylstyrene;

wherein copolymer (a) has a weight average molar mass $M_w$ of 80,000 to 250,000 g/mol;
  (b) 8 to 25 wt.-% of at least one graft copolymer (b) consisting of 15 to 60 wt.-% of a graft sheath (b2) and 40 to 85 wt.-% of a graft substrate (b1), wherein (b1) is at least one agglomerated butadiene rubber latex and wherein (b1) and (b2) sum up to 100 wt.-%,
  obtained by emulsion polymerization of
    styrene and acrylonitrile in a weight ratio of 95:5 to 65:35 to obtain a graft sheath (b2), wherein the styrene and/or acrylonitrile is optionally replaced partially by alpha-methylstyrene, methyl methacrylate, maleic anhydride or N-phenylmaleimide, or mixtures thereof,
    in the presence of the at least one agglomerated butadiene rubber latex (b1) with a median weight particle diameter $D_{50}$ of 150 to 800 nm,
    where the at least one agglomerated rubber latex (b1) is obtained by agglomeration of at least one starting butadiene rubber latex (s-b1) having a median weight particle diameter $D_{50}$ of equal to or less than 120 nm;
  (c) 8 to 30 wt.-% of at least one coupled conjugated diene/monovinylarene block copolymer (c) comprising at least three consecutive conjugated diene/monovinylarene tapered polymer blocks, wherein in the final block copolymer all conjugated diene is incorporated into the tapered polymer blocks, and, based on the total weight of the final block copolymer, the monovinylarene is present in an amount of 58 to 68 wt.-%, and the conjugated diene is present in an amount of 32 to 42 wt.-%; and
  (d) 0 to 5 wt.-% of further additives and/or processing aids (d);
  where the components a, b, c, and, if present d, sum to 100 wt.-%.

2. The thermoplastic molding composition according to claim 1, comprising:
  60 to 75 wt.-% component (a),
  8 to 20 wt.-% component (b),
  8 to 25 wt.-% component (c), and
  0 to 5 wt.-% component (d).

3. The thermoplastic molding composition according to claim 1, comprising:
60 to 70 wt.-% component (a),
8 to 17 wt.-% component (b),
9 to 22 wt.-% component (c), and
0 to 5 wt.-% component (d).

4. The thermoplastic molding composition according to claim 1, wherein copolymer (a) is a copolymer of styrene and acrylonitrile in a weight ratio of from 75:25 to 70:30.

5. The thermoplastic molding composition according to claim 1, wherein $M_w$ of copolymer (a) is 90,000 to 150,000 g/mol.

6. The thermoplastic molding composition according to claim 1, wherein the graft sheath (b2) of graft copolymer (b) is obtained by emulsion polymerization of styrene and acrylonitrile in a weight ratio of 80:20 to 65:35.

7. The thermoplastic molding composition according to claim 1, wherein the agglomerated butadiene rubber latex (b1) of graft copolymer (b) has a median weight particle diameter $D_{50}$ of 200 to 600 nm.

8. The thermoplastic molding composition according to claim 1, wherein, based on the total weight of the final block copolymer (c), the monovinylarene is present in an amount of 61 to 64 wt.-% and the conjugated diene is present in an amount of 36 to 39 wt.-%.

9. The thermoplastic molding composition according to claim 1, wherein in block copolymer (c) the conjugated diene is 1,3-butadiene and the monovinylarene is styrene.

10. The thermoplastic molding composition according to claim 1, wherein in each individual tapered polymer block of block copolymer (c) the monovinylarene is present in an amount of from 2 to 18 wt.-%, based on the total weight of the final block copolymer, and the conjugated diene is present in an amount of from 8 to 17 wt.-%, based on the total weight of the final block copolymer.

11. The thermoplastic molding composition according to claim 1, where block copolymer (c) comprises at least one polymer chain of the formula

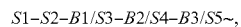

$S1–S2–B1/S3–B2/S4–B3/S5\sim,$ wherein S1 and S2 are monovinylarene blocks, blocks B1/S3, B2/S4, B3/S5 are tapered blocks containing a mixture of monovinylarene and conjugated diene, and ~ is the bond to a coupling agent.

12. The thermoplastic molding composition according to claim 1, wherein in each tapered polymer block of block copolymer (c) the conjugated diene is present in an amount of from 0.6 parts to 4 parts per part monovinylarene in the tapered polymer block.

13. A process for the preparation of the thermoplastic molding composition according to claim 1 by melt mixing the components (a), (b), (c), and, if present, (d), at temperatures in the range of from 180° C. to 250° C.

14. A shaped article made from the thermoplastic molding composition according to claim 1.

* * * * *